United States Patent
Bischof et al.

(10) Patent No.: US 10,557,498 B1
(45) Date of Patent: Feb. 11, 2020

(54) FULL-FLOATING BEARING AND TURBOCHARGER INCLUDING THE SAME

(71) Applicant: BorgWarner Inc., Auburn Hills, MI (US)

(72) Inventors: Kenneth Richard Bischof, Arden, NC (US); Zachary S. Ashton, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/158,962

(22) Filed: Oct. 12, 2018

(51) Int. Cl.
  *F16C 17/02* (2006.01)
  *F16C 17/10* (2006.01)
  (Continued)

(52) U.S. Cl.
  CPC .............. *F16C 17/18* (2013.01); *F01D 25/16* (2013.01); *F01D 25/18* (2013.01); *F16C 17/02* (2013.01); *F16C 17/10* (2013.01); *F16C 27/02* (2013.01); *F16C 33/1065* (2013.01); *F16C 33/1075* (2013.01); *F04D 29/047* (2013.01);
  (Continued)

(58) Field of Classification Search
  CPC .......... F16C 17/02; F16C 17/10; F16C 27/02; F16C 37/02; F16C 33/1065; F16C 33/1075; F16C 2220/40; F16C 2220/54; F16C 2360/24; F16C 17/18; F16C 2220/60;
  (Continued)

(56) References Cited

U.S. PATENT DOCUMENTS 2,566,080 A * 8/1951 Davids ...................... F16C 9/04
                                                             384/291
3,604,770 A * 9/1971 Peltier ................... F16C 17/028
                                                             384/286
(Continued)

FOREIGN PATENT DOCUMENTS

CN   102192238 B   1/2013
DE   102016224094 A * 12/2016   ........... F04D 29/056
(Continued)

OTHER PUBLICATIONS

Allaire, P.E., et al., "Design of Journal Bearings for Rotating Machinery", Proceedings of the Tenth Turbomachinery Symposium, 1981, Cover Sheet, Table of Contents and pp. 25-46.
(Continued)

*Primary Examiner* — Marcus Charles
(74) *Attorney, Agent, or Firm* — Howard & Howard Attorneys PLLC

(57) ABSTRACT

A full-floating bearing for reducing vibration of a shaft of a turbocharger has a central axis and includes an outer surface and an inner surface. The outer surface is configured to face away from the central axis. The inner surface is configured to face the central axis and is radially spaced from the outer surface such that the inner surface is configured to be disposed between the central axis and the outer surface. An aperture is defined between the outer surface and the inner surface and configured to allow lubricant to flow between the outer surface and the inner surface. The inner surface has a surface profile for reducing vibration of the shaft of the turbocharger. The surface profile is defined by the equation $Ro = Rb + A \sin(3\theta + \Phi)$.

18 Claims, 4 Drawing Sheets

(51) Int. Cl.
*F16C 27/02* (2006.01)
*F16C 33/10* (2006.01)
*F01D 25/16* (2006.01)
*F04D 29/047* (2006.01)
*F16C 17/18* (2006.01)
*F01D 25/18* (2006.01)

(52) U.S. Cl.
CPC ...... *F05D 2240/54* (2013.01); *F16C 2220/60* (2013.01); *F16C 2360/24* (2013.01)

(58) Field of Classification Search
CPC .......... F02B 39/14; F01D 25/16; F01D 25/18; F05D 2240/54; F04D 39/046; F04D 29/047
USPC ....... 384/120, 129, 282–286, 291, 428, 901; 415/170.1, 229
See application file for complete search history.

(56) References Cited

U.S. PATENT DOCUMENTS

| | | | |
|---|---|---|---|
| 4,427,309 | A | 1/1984 | Blake |
| 5,120,091 | A | 6/1992 | Nakagawa |
| 8,790,066 | B2 | 7/2014 | Gutknecht |
| 9,279,453 | B2 * | 3/2016 | Laubender ............... F16C 17/02 |
| 9,664,063 | B2 * | 5/2017 | Boening ............... F01D 25/166 |
| 9,726,189 | B2 | 8/2017 | Nishida et al. |
| 9,777,766 | B1 * | 10/2017 | Bischof ................ F16C 17/107 |
| 2006/0078239 | A1 * | 4/2006 | Dimofte .............. F16C 32/0685 384/100 |
| 2009/0110572 | A1 * | 4/2009 | Meacham .................. F02C 6/12 417/406 |
| 2011/0200422 | A1 | 8/2011 | Gutknecht |
| 2014/0010647 | A1 * | 1/2014 | Nishida ................... F16C 17/18 415/229 |
| 2014/0112776 | A1 * | 4/2014 | Kamata ................ F01D 25/166 415/229 |
| 2014/0119898 | A1 * | 5/2014 | Nishida .................. F02M 55/00 415/170.1 |
| 2016/0223014 | A1 | 8/2016 | Nakamura |
| 2016/0348577 | A1 * | 12/2016 | Uneura ................... F01D 25/20 |
| 2017/0009810 | A1 | 1/2017 | Futae et al. |
| 2018/0128163 | A1 * | 5/2018 | Ueda ....................... F16C 17/10 |
| 2018/0156273 | A1 | 6/2018 | Kleinschmidt et al. |

FOREIGN PATENT DOCUMENTS

| | | | | |
|---|---|---|---|---|
| DE | 102015213504 | A1 | | 1/2017 |
| JP | 2005232998 | A | * | 9/2009 .............. F02B 39/00 |

OTHER PUBLICATIONS

Ashton, G. et al., "Reduction of On-Road Turbocharger Sub-Synchronous Response Using Tapered and Lobe Bearings", IMechE 13th International Conference on Turbochargers and Turbocharging, 2018, pp. 183-194.
Chen et al., "Introduction to Dynamics of Rotor-Bearing Systems", 2005, pp. 1-20.
Chen, "Practical Rotordynamics and Fluid Film Bearing Design" 2015, pp. 1-22.
Chen, "Rotodynamic Characteristics of Large Locomotive Turbochargers", The 8th IFToMM International Conference on Rotor Dynamics, Sep. 12-15, 2010/KIST, Seoul, Korea, pp. 108-115.
Dimofte, Florin et al., "No Conventional Fluid Film Bearings With Waved Surface", 2011, pp. 335-358.
English language abstract and English translation for CN 102192238 provided by SIPO on Sep. 20, 2018, 10 pages.
Machine-assisted English language abstract and machine-assisted English translation for DE 10 2015 213 504 extracted from espacenet.com database on Oct. 31, 2018, 11 pages.
Salamone, Dana J., "Journal Bearing Design Types and Their Applications to TurboMachinery", Proceedings to the Thirteenth Turbomachinery Symposium, 1984, Cover Sheet, Table of Contents and pp. 179-190.

* cited by examiner

FULL-FLOATING BEARING AND TURBOCHARGER INCLUDING THE SAME

BACKGROUND OF THE INVENTION

1. Field of the Invention

The present invention generally relates to a full-floating bearing for a turbocharger, and to a turbocharger including the full-floating bearing.

2. Description of the Related Art

Rotating machines, such as turbochargers, are used in various applications, such as automotive vehicles, heavy equipment, diesel engines, motors, and the like. Typical turbochargers include a turbine wheel, a shaft coupled to and rotatable by the turbine wheel and extending along a shaft axis, a compressor wheel coupled to and rotatable by the shaft, a bearing housing extending along the shaft axis between the turbine wheel and the compressor wheel, and a full-floating bearing disposed about the shaft and in the bearing housing to rotatably support the shaft. The full-floating bearing that rotatably supports the shaft has a central axis and includes an inner surface facing the shaft. The inner surface has a surface profile that is circular.

During operation of the turbocharger, lubricant is delivered to the inner surface of the full-floating bearing and the shaft via one or more apertures defined by the full-floating bearing, resulting in lubrication of the inner surface and the shaft. Lubrication of the inner surface and the shaft allows the full-floating bearing to rotatably support the shaft while reducing frictional wear of the full-floating bearing and the shaft. However, in conventional turbochargers, the circular surface profile of the full-floating bearing results in a sub-synchronous vibration of the shaft during operation of the turbocharger. This sub-synchronous vibration of the shaft is undesirable, particularly when the turbocharger is used in automotive vehicle applications, because of the resultant noise that is generated during operation the turbocharger. This sub-synchronous vibration may also lead to premature failure of various components of the turbocharger, thereby reducing lifetime of the turbocharger.

In addition, attempts to design a full-floating bearing having a surface profile that is non-circular for automotive vehicle applications have been unsuccessful because of an increased manufacturing cost that is associated with producing a surface profile that is non-circular.

As such, there remains a need to provide an improved full-floating bearing.

SUMMARY OF THE INVENTION AND ADVANTAGES

A turbocharger delivers compressed air to an internal combustion engine and receives exhaust gas from the internal combustion engine. The turbocharger includes a turbine wheel, a shaft coupled to and rotatable by the turbine wheel, with the shaft extending along a shaft axis, and a compressor wheel coupled to the shaft and rotatable by the shaft for delivering compressed air to the internal combustion engine. The turbocharger also includes a bearing housing extending along the shaft axis between the turbine wheel and the compressor wheel, with the bearing housing defining a bearing housing interior, and with the bearing housing disposed about the shaft such that the shaft is disposed at least partially in the bearing housing interior. The turbocharger further includes a full-floating bearing disposed about the shaft and in the bearing housing interior, with the full-floating bearing having a central axis. The full-floating bearing includes an outer surface facing the bearing housing away from the central axis, and an inner surface facing the shaft and radially spaced from the outer surface with respect to the central axis such that the inner surface is disposed between the central axis and the outer surface. The full-floating bearing defines an aperture between the outer surface the inner surface that is configured to allow lubricant to flow between the outer surface and the inner surface. The inner surface has a surface profile for reducing vibration of the shaft. The surface profile is defined by an equation $Ro=Rb+A \sin(3\theta+\Phi)$ where, $Ro$ is a distance from the central axis to the inner surface for a given angle $\theta$, $Rb$ is an average distance from the central axis to the inner surface, $A$ is a difference between a maximum $Ro$ and $Rb$, $\theta$ is from 0 to $2\pi$ radians about the central axis with respect to a reference line extending perpendicularly from the central axis through the aperture, and $\Phi$ is a phase shift from 0 to $2\pi$ radians.

Accordingly, the full-floating bearing having the surface profile defined by the equation $Ro=Rb+A \sin(3\theta+\Phi)$ reduces vibration of the shaft, which improves NVH (i.e., noise, vibration, and harshness) characteristics of the turbocharger, particularly when the turbocharger is used in automotive vehicle applications. Moreover, the full-floating bearing having the surface profile defined by the equation $Ro=Rb+A \sin(3\theta+\Phi)$ can be manufactured on a scale suitable for automotive vehicle applications without a significant cost increase as compared to conventional full-floating bearings having a surface profile that is circular.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
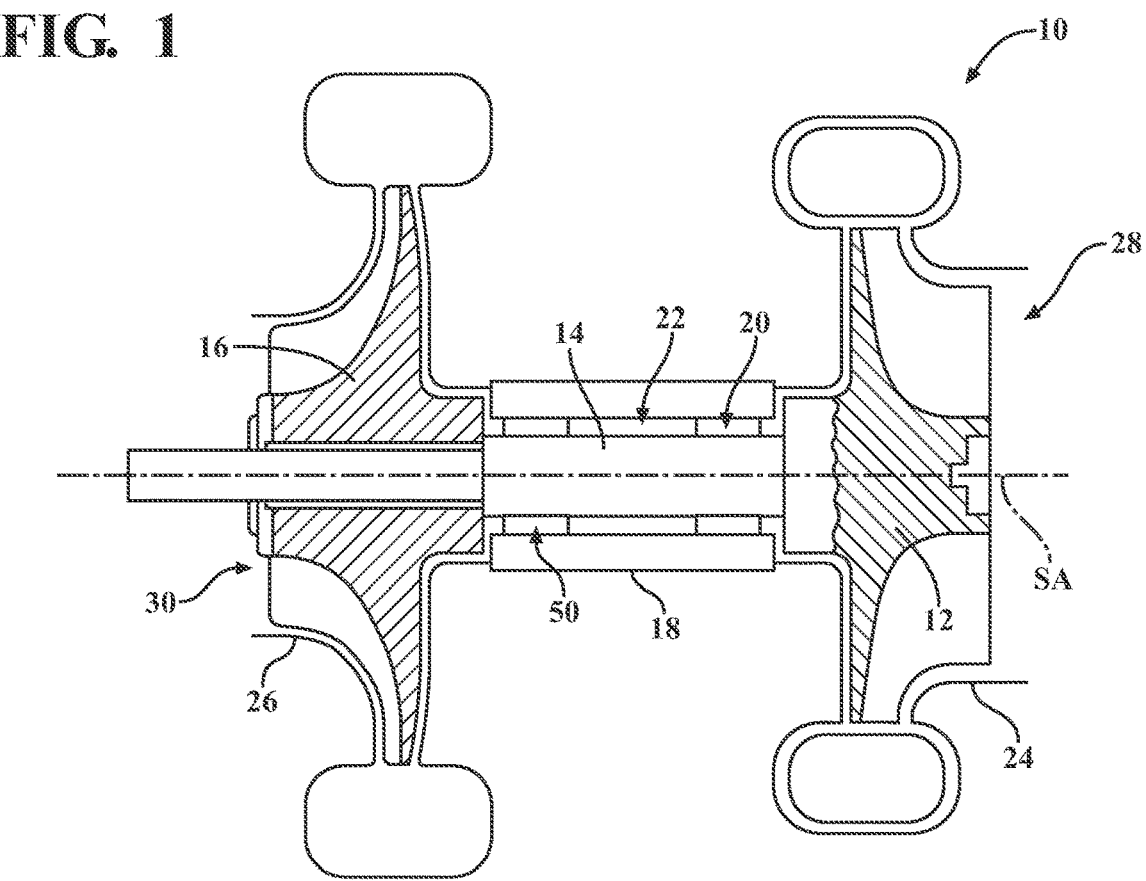
FIG. 1 is a schematic representation of a turbocharger.

With reference to the Figures, wherein like numerals indicate like parts throughout the several views, a schematic representation of a turbocharger 10 for receiving exhaust gas from an internal combustion engine (not shown) and delivering compressed air to the internal combustion engine is shown in FIG. 1. Although not required, the turbocharger 10 is typically used in automotive vehicle applications, heavy equipment, diesel engines, motors, and the like. The turbocharger 10 includes a turbine wheel 12, a shaft 14, a compressor wheel 16, a bearing housing 18, and a full-floating bearing 20.

During operation of the turbocharger 10, the turbine wheel 12 receives exhaust gas from the internal combustion which causes the turbine wheel 12 to rotate. The shaft 14 is coupled to and rotatable by the turbine wheel 12. The shaft 14 extends along a shaft axis SA. The compressor wheel 16 is coupled to the shaft 14 and is rotatable by the shaft 14 for delivering compressed air to the internal combustion engine. The bearing housing 18 extends along the shaft axis SA between the turbine wheel 12 and the compressor wheel 16. As shown in FIG. 1, the bearing housing 18 defines a bearing housing interior 22 and is disposed about the shaft 14 such that the shaft 14 is disposed at least partially in the bearing housing interior 22. The full-floating bearing 20 is disposed about the shaft 14 and in the bearing housing interior 22. The bearing housing 18 is coupled to a lubricant source that delivers lubricant to the bearing housing interior 22 and, via one or more lubricant channels in the bearing housing interior 22, the full-floating bearing 20.

In the context of this disclosure, the term "full-floating bearing" refers to a bearing that is free of any coupling to the bearing housing 18 such that the full-floating bearing 20 is freely rotatable about the shaft 14 with respect to the bearing housing 18. The full-floating bearing 20 is distinguished from a semi-floating bearing. A semi-floating bearing is operably coupled to the bearing housing 18 such that the semi-floating bearing cannot freely rotate about the shaft 14 with respect to the bearing housing 18.

With continued reference to FIG. 1, the turbocharger 10 may also include a turbine housing 24 and a compressor housing 26. When the turbine housing 24 is present, the turbine housing 24 defines a turbine housing interior 28 and the turbine wheel 12 is disposed in the turbine housing interior 28. When the compressor housing 26 is present, the compressor housing 26 defines a compressor housing interior 30 and the compressor wheel 16 is disposed in the compressor housing interior 30.

Figure 2:
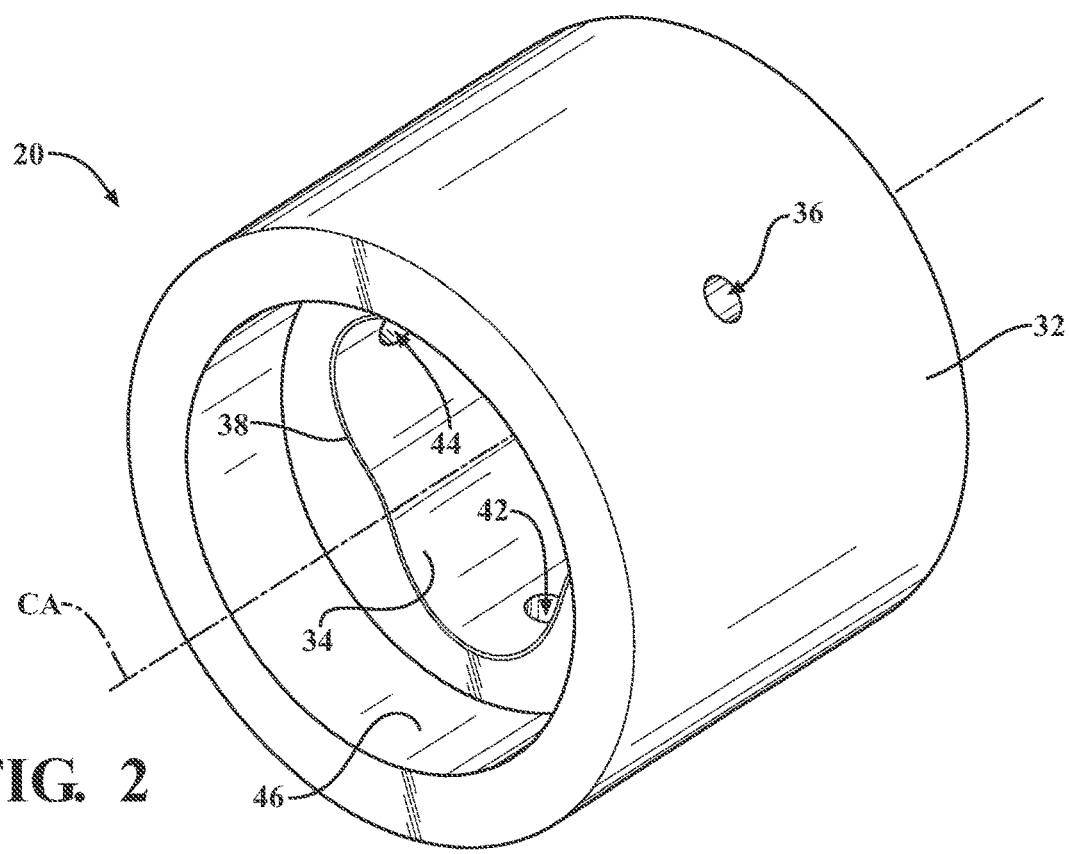
FIG. 2 is an isometric view of a full-floating bearing according to one embodiment, with the full-floating bearing including an inner surface having a surface profile defined by an equation $Ro=Rb+A \sin(3\theta+\Phi)$.

With reference to FIG. 2, the full-floating bearing 20 has a central axis CA. The full-floating bearing 20 includes an outer surface 32 configured to face away from the central axis CA. As shown in FIG. 1, when the full-floating bearing 20 is included in the turbocharger 10, the outer surface 32 faces the bearing housing 18. With continued reference to FIG. 2, the full-floating bearing 20 includes an inner surface 34 configured to face the central axis CA and radially spaced from the outer surface 32 with respect to the central axis CA such that the inner surface 34 is configured to be disposed between the central axis CA and the outer surface 32. When the full-floating bearing 20 is included in the turbocharger 10, the inner surface 34 faces the shaft 14.

Figure 4:
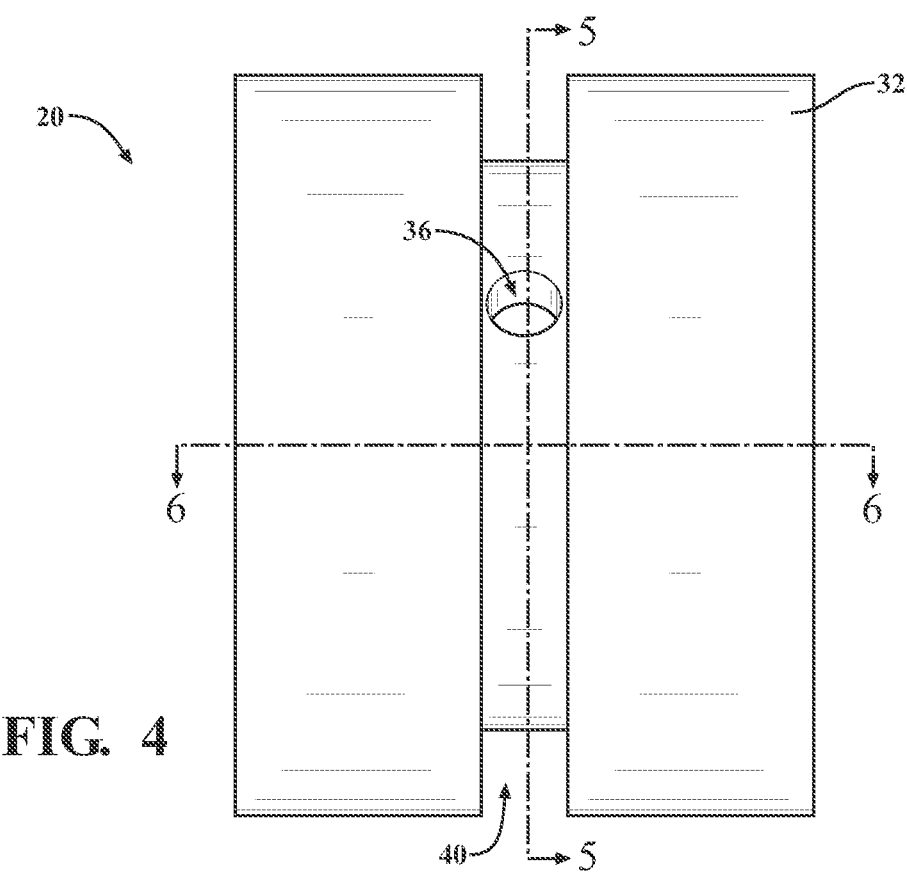
FIG. 4 is a side view of the full-floating bearing of FIG. 3 showing the annular groove, and an aperture defined between the outer surface and the inner surface configured to allow the lubricant to flow between the outer surface and the outer surface.

With continued reference to FIG. 2, an aperture 36 is defined between the outer surface 32 and in the inner surface 34 and is configured to allow the lubricant to flow between the outer surface 32 and in the inner surface 34. Furthermore, the aperture 36 allows for the lubricant delivered to the outer surface 32 of the full-floating bearing 20 via the one more lubricant channels in the bearing housing interior 22 to flow between the outer and inner surfaces 32, 34 to the shaft 14. In this manner, the aperture 36 allows for lubrication of the inner surface 34 and the shaft 14, thereby reducing frictional wear of the inner surface 34 of the full-floating bearing 20 and the shaft 14 during operation of the turbocharger 10. Although not required, typically the aperture 36 has a cylindrical configuration as shown in FIGS. 2 and 4. However, it is to be appreciated that the aperture 36 may have any configuration suitable for delivering the lubricant from the outer surface 32 to the inner surface 34 such as a rectangular configuration. In some embodiments, the aperture 36 is further defined as a first aperture 36.

Figure 3:
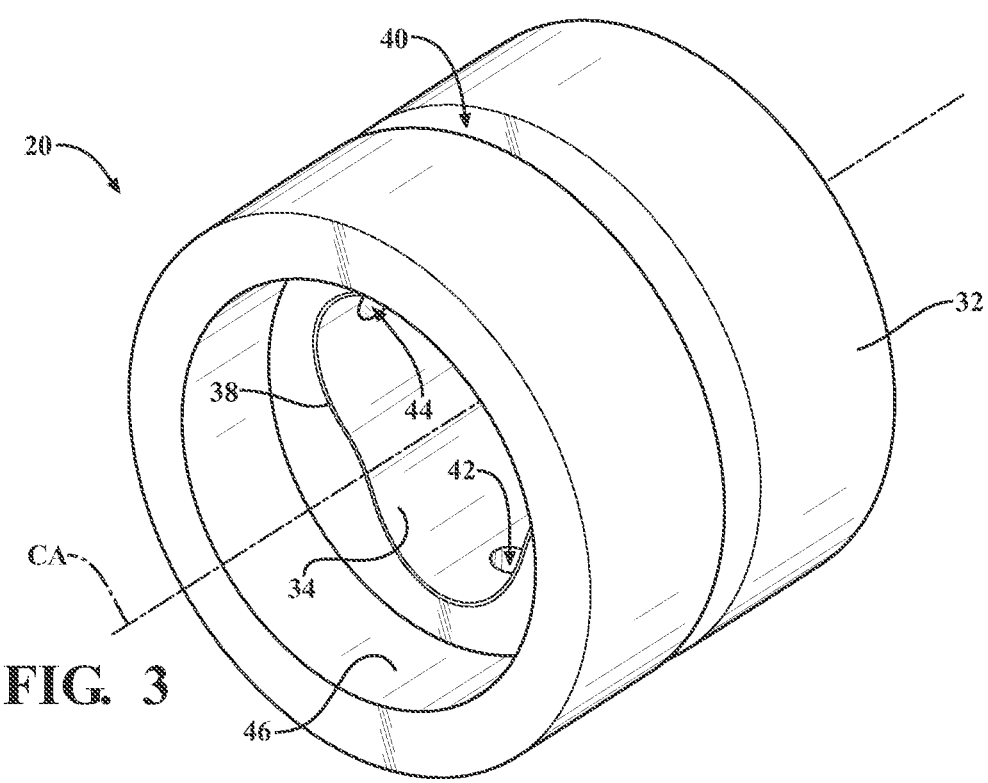
FIG. 3 is an isometric view of a full-floating bearing according to another embodiment, with the full-floating bearing including an outer surface defining an annular groove configured to receive lubricant and an inner surface having a surface profile defined by an equation $Ro=Rb+A \sin(3\theta+\Phi)$.
Figure 5:
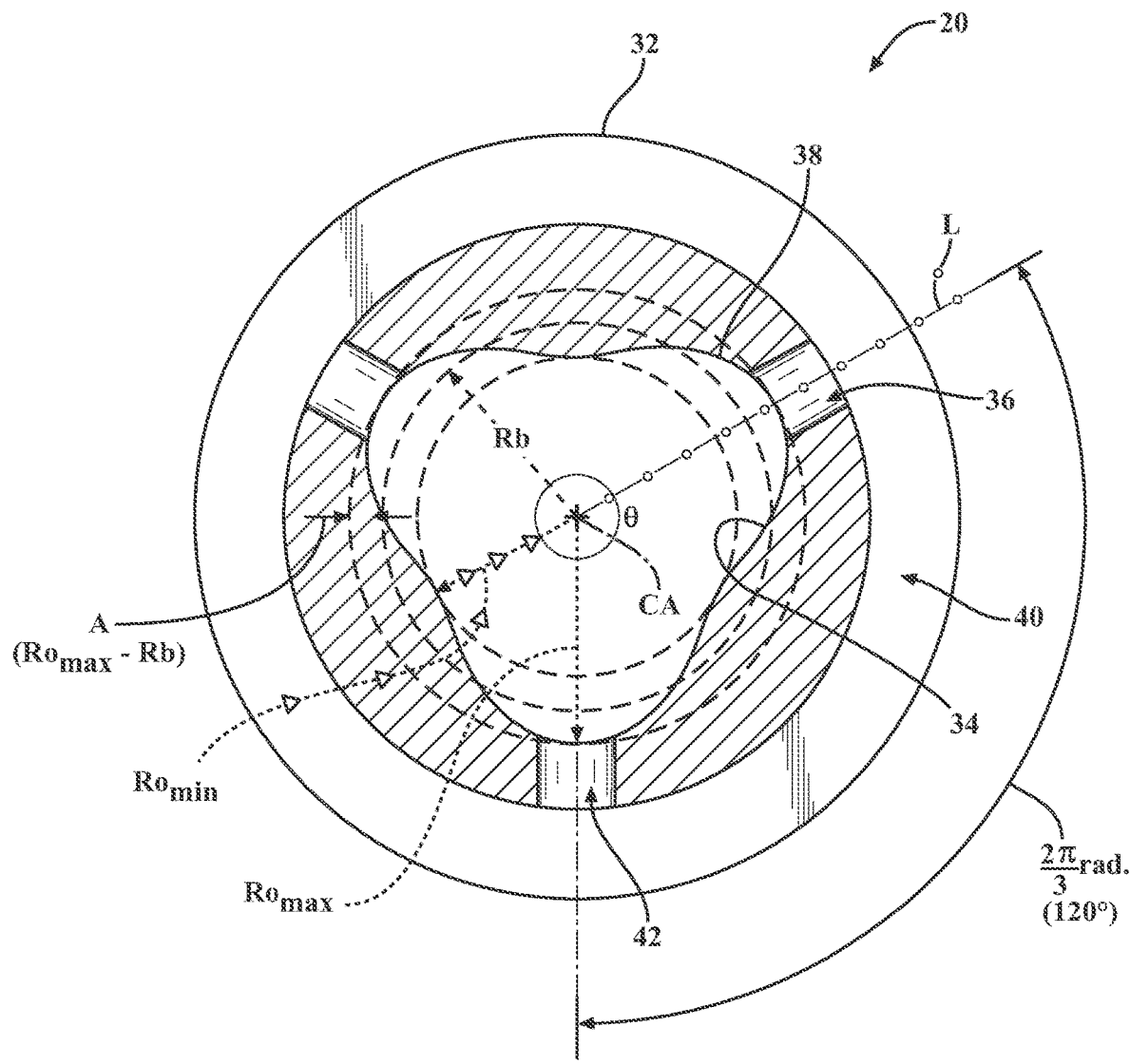
FIG. 5 is a cross-sectional view of the full-floating bearing of FIG. 3 taken along line 5-5 in FIG. 4.

With reference to FIGS. 2, 3, and 5, the inner surface 34 has a surface profile 38 for reducing vibration, particularly sub-synchronous vibration, of the shaft 14. With reference to FIG. 5, the surface profile 38 is defined by an equation $Ro=Rb+A \sin(3\theta+\Phi)$ where Ro is a distance from the central axis CA to the inner surface 34 for a given angle $\theta$, Rb is an average distance from the central axis CA to the inner surface 34, A is a difference between a maximum Ro and Rb, $\theta$ is from 0 to $2\pi$ radians (0° to 360°) about the central axis CA with respect to a reference line L extending perpendicularly from the central axis CA through the aperture 36, and $\Phi$ is a phase shift from 0 to $2\pi$ radians (0° to 360°).

With continued reference to FIG. 5, the surface profile 38 defined by the equation $Ro=Rb+A \sin(3\theta+\Phi)$ has three equivalent maximum Ro values that define a circle with respect to the central axis CA having a radius $Ro_{max}$. It is to be appreciated that, in the context of this disclosure, the maximum Ro value may be interchangeably referred to as $Ro_{max}$. The surface profile 38 also has three equivalent minimum Ro values that define a circle having a radius $Ro_{min}$. It is to be appreciated that, in the context of this disclosure, the minimum Ro value may be interchangeably referred to as $Ro_{min}$. The average distance Rb of the inner surface 34 from the central axis CA is an average of $Ro_{max}$ and $Ro_{min}$ $$\left(\text{i.e., } Rb = \frac{Ro_{max} + Ro_{min}}{2}\right).$$

It is to be further appreciated that $Ro_{max}$ and $Ro_{min}$ correspond to a maximum clearance and a minimum clearance of the full-floating bearing 20 with respect to the shaft 14. Specifically, the maximum clearance of the full-floating bearing 20 with respect to the shaft 14 is a difference between $Ro_{max}$ and a radius of the shaft 14. Similarly, the minimum clearance of the full-floating bearing 20 with respect to the shaft 14 is a difference between $Ro_{min}$ and the radius of the shaft 14.

Typically, the Rb and A values are selected based on the radius of the shaft 14 and desired maximum and minimum clearances of the full-floating bearing 20 with respect to the shaft 14.

The surface profile 38 is non-circular. Because the surface profile 38 is non-circular, the full-floating bearing 20 reduces frictional wear of the shaft 14 while also reducing vibration of the shaft 14, particularly sub-synchronous vibration. Moreover, the full-floating bearing 20 having the surface profile 38 may be manufactured on a scale suitable for automotive vehicle applications in a cost effective manner because the surface profile 38 is particularly suitable for machining.

As described above, the phase shift $\Phi$ of the equation $Ro=Rb+A\sin(3\theta+\Phi)$ may be from 0 to $2\pi$ radians (0° to 360°). Typically, the phase shift $\Phi$ is from $11\pi/36$ radians to $25\pi/36$ radians (55° to 125°), $7\pi/18$ radians to $11\pi/18$ radians (70° to 110°), or $4\pi/9$ radians to $5\pi/9$ radians (80° to 100°). In some embodiments, the phase shift $\Phi$ is from $11\pi/36$ radians to $25\pi/36$ radians (55° to 125°). When the phase shift $\Phi$ is from $11\pi/36$ radians to $25\pi/36$ radians (55° to 125°), one of the three $Ro_{max}$ values is sufficiently aligned with the aperture 36 such that the aperture 36 is defined in the inner surface 34 at a point where the inner surface 34 is near, or is, a maximum distance away from the central axis CA. This alignment of one of the three $Ro_{max}$ values with the aperture 36 ensures that the lubricant flows to the inner surface 34 near, or at, the maximum clearance of the full-floating bearing 20 with respect to the shaft 14, allowing for rotation of the shaft 14 to lubricate portions of the inner surface 34 near the three $Ro_{min}$ values via forces generated by rotation of the shaft 14.

With reference to FIG. 5, in the illustrated embodiment, the phase shift is $\pi/2$ radians (90°). When the phase shift $\Phi$ is $\pi/2$ radians (90°), the aperture 36 is defined by the inner surface 34 at one of the three $Ro_{max}$ values.

As best shown in FIGS. 3-6, although not required, the outer surface 32 of the full-floating bearing 20 may define an annular groove 40 circumferentially about the central axis CA. When the annular groove 40 is present, the annular groove 40 is configured to receive the lubricant delivered to the outer surface 32 of the full-floating bearing 20 via the one more lubricant channels in the bearing housing interior 22. Furthermore, when the annular groove 40 is present, the aperture 36 may be defined between the annular groove 40 and the inner surface 34 and configured to allow the lubricant to flow between the annular groove 40 and the inner surface 34.

As described above, the full-floating bearing 20 is freely rotatable about the shaft 14 with respect to the bearing housing 18. During operation of the turbocharger 10, rotation of the shaft 14 causes rotation of the full-floating bearing 20, albeit at a slower speed than the shaft 14. Rotation of the full-floating bearing 20 results in a radial centrifugal force that forces the lubricant away from both the shaft 14 and the inner surface 34 of the full-floating bearing 20. Specifically, the radial centrifugal force forces the lubricant away from both the shaft 14 and the inner surface 34 of the full-floating bearing 20 through the aperture 36, resulting in insufficient lubrication of the inner surface 34 and the shaft 14. Insufficient lubrication of the inner surface 34 and the shaft 14 decreases efficiency of the turbocharger 10, and increases the frictional wear of the full-floating bearing 20 and the shaft 14 thereby reducing lifetime of the turbocharger 10. However, when the outer surface 32 defines the annular groove 40, the radial centrifugal force generated from rotation of the full-floating bearing 20 is reduced. This reduction of the radial centrifugal force results in sufficient lubrication of the shaft 14 and inner surface 34 being maintained during operation of the turbocharger 10, thereby increasing efficiency of the turbocharger 10, reducing frictional wear of the full-floating bearing 20 and the shaft 14, and increasing lifetime of the turbocharger 10.

As best shown in FIG. 5, a second aperture 42 may be defined between the outer surface 32 and the inner surface 34 and be configured to allow the lubricant to flow between the outer surface 32 and in the inner surface 34. Like the first aperture 36, the second aperture 42 allows for the lubricant delivered to the outer surface 32 of the full-floating bearing 20 via the one more lubricant channels in the bearing housing interior 22 to flow between the outer and inner surfaces 32, 34 to the shaft 14. In this manner, the second aperture 42 allows for lubrication of the inner surface 34 and the shaft 14, thereby reducing frictional wear of the inner surface 34 of the full-floating bearing 20 and the shaft 14 during operation of the turbocharger 10. Although not required, typically the second aperture 42 has a cylindrical configuration as shown in FIG. 2. However, it is to be appreciated that the second aperture 42 may have any configuration suitable for delivering the lubricant from the outer surface 32 to the inner surface 34 such as a rectangular configuration.

With continued reference to FIG. 5, when the annular groove 40 and the second aperture 42 are present, the second aperture 42 may be defined between the annular groove 40 and the inner surface 34 and be configured to allow the lubricant to flow between the annular groove 40 and the inner surface 34.

When the second aperture 42 is present, the first and second apertures 36, 42 may be spaced circumferentially from each other at an angle of from $5\pi/9$ radians to $7\pi/9$ radians (100° to 140°), $11\pi/18$ radians to $13\pi/18$ radians (110° to 130°), or $23\pi/36$ radians to $257\pi/36$ radians (115° to 125°), with respect to the central axis CA. In some embodiments, the first and second apertures 36, 42 are spaced circumferentially from each other at an angle of from $5\pi/9$ radians to $7\pi/9$ radians (100° to 140°) with respect to the central axis CA. Although not required, when the first and second apertures 36, 42 are spaced circumferentially from each other at an angle of $5\pi/9$ radians to $7\pi/9$ radians (100° to 140°), the phase shift $\Phi$ may be from $11\pi/36$ radians to $25\pi/36$ radians (55° to 125°). When the phase shift $\Phi$ is from $11\pi/36$ radians to $25\pi/36$ radians (55° to 125°), one of the three $Ro_{max}$ values is sufficiently aligned with a respective one of the first and second apertures 36, 42 such that the first and second apertures 36, 42 are defined in the inner surface 34 at a point where the inner surface 34 is near, or is, a maximum distance away from the central axis CA.

As shown in FIG. 5, in some embodiments, the first and second apertures 36, 42 are spaced circumferentially from each other at an angle of $2\pi/3$ radians (120°). When the first and second apertures 36, 42 are spaced circumferentially from each other at an angle of $2\pi/3$ radians (120°), the phase shift $\Phi$ may be $\pi/2$ radians (90°). When the phase shift $\Phi$ is $\pi/2$ radians) (90°), the first and second apertures 36, 42 are defined by the inner surface 34 at a respective one of the three $Ro_{max}$ values.

With continued reference to FIG. 5, a third aperture 44 may be defined between the outer surface 32 and the inner surface 34 and be configured to allow the lubricant to flow between the outer surface 32 and in the inner surface 34. Like the first and second apertures 36, 42, the third aperture 44 allows for the lubricant delivered to the outer surface 32 of the full-floating bearing 20 via the one more lubricant channels in the bearing housing interior 22 to flow between the outer and inner surfaces 32, 34 to the shaft 14. In this manner, the third aperture 44 allows for lubrication of the inner surface 34 and the shaft 14, thereby reducing frictional wear of the inner surface 34 of the full-floating bearing 20 and the shaft 14 during operation of the turbocharger 10. Although not required, typically the third aperture 44 has a cylindrical configuration as shown in FIG. 2. However, it is to be appreciated that the third aperture 44 may have any configuration suitable for delivering the lubricant from the outer surface 32 to the inner surface 34 such as a rectangular configuration.

With continued reference to FIG. 5, when the annular groove 40 and the third aperture 44 are present, the third aperture 44 may be defined between the annular groove 40 and the inner surface 34 and be configured to allow the lubricant to flow between the annular groove 40 and the inner surface 34.

When the third aperture 44 is present, the first, second, and third apertures 36, 42, 44 may be spaced circumferentially from each other at an angle of from $5\pi/9$ radians to $7\pi/9$ radians (100° to 140°), $11\pi/18$ radians to $13\pi/18$ radians (110° to 130°), or $23\pi/36$ radians to $25\pi/36$ radians (115° to 125°), with respect to the central axis CA. In some embodiments, the first, second, and third apertures 36, 42, 44 are spaced circumferentially from each other at an angle of from $5\pi/9$ radians to $7\pi/9$ radians (100° to 140°) with respect to the central axis CA. Although not required, when the first, second, and third apertures 36, 42, 44 are spaced circumferentially from each other at an angle of $5\pi/9$ radians to $7\pi/9$ radians (100° to 140°), the phase shift $\Phi$ may be from $11\pi/36$ radians to $25\pi/36$ radians (55° to 125°). When the phase shift $\Phi$ is from $11\pi/36$ radians to $25\pi/36$ radians (55° to 125°), one of the three $Ro_{max}$ values is sufficiently aligned with a respective one of the first, second, and third apertures 36, 42, 44 such that the first, second, and third apertures 36, 42, 44 are defined in the inner surface 34 at a point where the inner surface 34 is near, or is, a maximum distance away from the central axis CA.

As shown in FIG. 5, in some embodiments, the first, second, and third apertures 36, 42, 44 are spaced circumferentially from each other at an angle of $2\pi/3$ radians (120°). When the first, second, and third apertures 36, 42, 44 are spaced circumferentially from each other at an angle of $2\pi/3$ radians (120°), the phase shift $\Phi$ may be $\pi/2$ radians (90°). When the phase shift $\Phi$ is $\pi/2$ radians (90°), the first, second, and third apertures 36, 42, 44 are defined by the inner surface 34 at a respective one of the three $Ro_{max}$ values.

Figure 6:
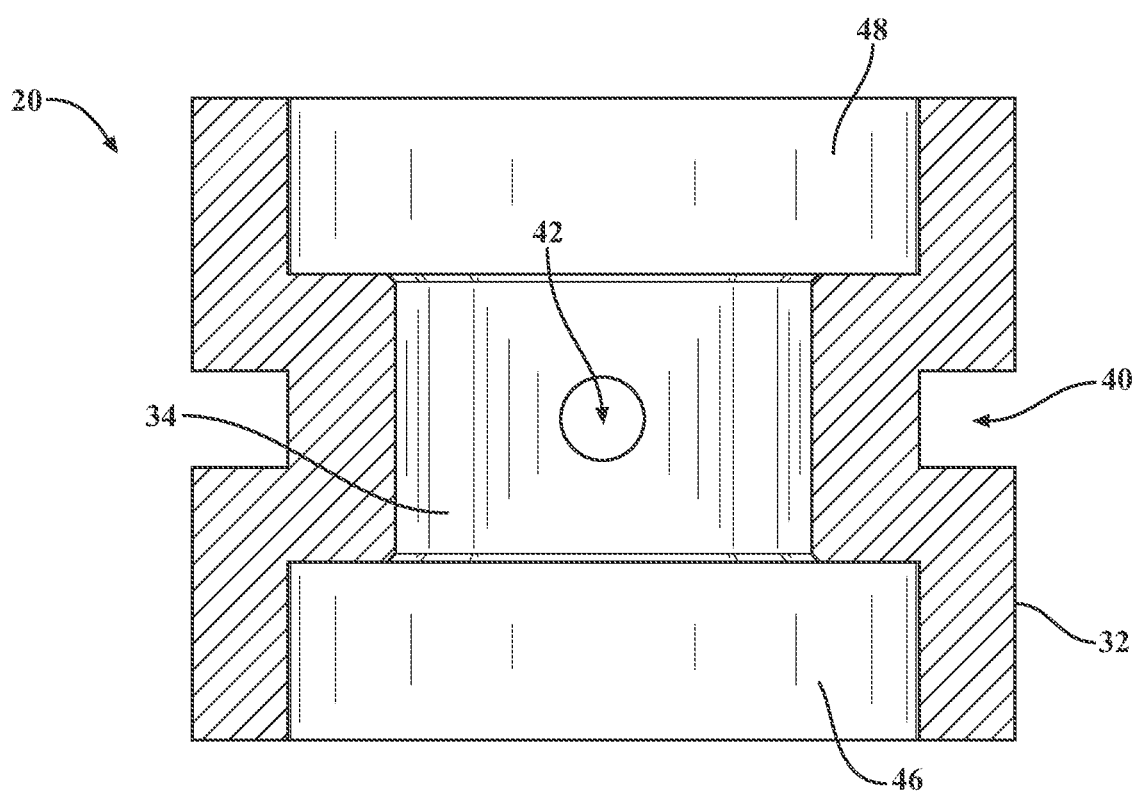
FIG. 6 is a cross-sectional view of the full-floating bearing of FIG. 3 taken along line 6-6 in FIG. 4.

In some embodiments, the inner surface 34 is further defined as a first inner surface 34. As shown in FIGS. 2, 3, and 6, in some embodiments, the full-floating bearing 20 includes a second inner surface 46. When present, the second inner surface 46 is radially recessed from the first inner surface 34 away from the central axis CA. The second inner surface 46 is configured to face the central axis CA. When the full-floating bearing 20 is included in the turbocharger 10, the second inner surface 46 faces the shaft 14.

With reference to FIG. 6, in some embodiments, the full-floating bearing 20 further includes a third inner surface 48. When present, the third inner surface 48 is radially recessed from the first inner surface 34 away from the central axis CA. The third inner surface 48 is configured to face the central axis CA. When the full-floating bearing 20 is included in the turbocharger 10, the third inner surface 48 faces the shaft 14. When the second and third inner surfaces 46, 48 are present, the third inner surface 48 may be recessed from the first inner surface 34 away from the central axis CA at a distance that is the same as the second inner surface 46. Alternatively, the third inner surface 48 may be recessed from the first inner surface 34 away from the central axis CA at a distance that is different than the second inner surface 46. With continued reference to FIG. 6, when the second, and third inner surfaces 46, 48 are present, the first, second, and third inner surfaces 34, 46, 48 may be spaced from each other along the central axis CA such that the first inner surface 34 is disposed between the second and third inner surfaces 46, 48 along the central axis CA.

In some embodiments, the full-floating bearing 20 is defined as a first full-floating bearing 20. With reference to FIG. 1, in some embodiments, the turbocharger 10 includes a second full-floating bearing 50 disposed about the shaft 14 and in the bearing housing interior 22. The second full-floating bearing 50 is spaced from the first full-floating bearing 20 such that the first full-floating bearing 20 is disposed between the second full-floating bearing 50 and the turbine wheel 12. Although the second full-floating bearing 50 is not shown in greater detail, the second full-floating bearing 50 has a central axis and includes an outer surface configured to face away from the central axis. When the full-floating bearing 50 is included in the turbocharger 10, the outer surface of the second full-floating bearing 50 faces the bearing housing 18. The second full-floating bearing 50 also includes an inner surface configured to face the central axis and radially spaced from the outer surface with respect to the central axis such that the inner surface is configured to be disposed between the central axis and the outer surface. When the second full-floating bearing 50 is included in the turbocharger 10, the inner surface of the second full-floating bearing 50 faces the shaft 14. An aperture is defined between the outer surface and in the inner surface of the second full-floating bearing 50 and is configured to allow the lubricant to flow between the outer surface and in the inner surface of the second full-floating bearing 50. The inner surface of the second-full floating bearing 50 has a surface profile for reducing vibration of the shaft 14. The surface profile of the second full-floating bearing 50 is defined by the equation $Ro=Rb+A \sin(3\theta+\Phi)$.

It is to be appreciated that the second full-floating bearing 50 may include any of the features described above for the first full-floating bearing 20. For example, the second full-floating bearing 50 may include an annular groove defined by the outer surface of the second full-floating bearing 50 circumferentially about the central axis of the second full-floating bearing 50. When present, the annular groove of the second full-floating bearing 50 is configured to receive the lubricant and the aperture of the second full-floating bearing 50 is defined between the annular groove and the inner surface of the second full-floating bearing 50. As another example, the second full-floating bearing 50 may include first, second, and third apertures each defined between the outer surface and in the inner surface of the second full-floating bearing 50 and configured to allow the lubricant to flow between the outer surface and in the inner surface of the second full-floating bearing 50.

It is to be further appreciated that the first and second full-floating bearings 20, 50 may be the same. For example, the first and second full-floating bearings 20, 50 may each include first, second, and third apertures spaced circumferentially from each other at an angle of from $5\pi/9$ radians to $7\pi/9$ radians (100° to 140°) with respect to the central axis, and the phase shift $\Phi$ of the first and second full-floating bearings 20, 50 may be from $11\pi/36$ radians to $25\pi/36$ radians (55° to 125°). Moreover, the first, second, and third apertures of the first and second full-floating bearings 20, 50 may be spaced circumferentially apart from each other at an angle of $2\pi/3$ radians (120°) with respect the central axis and the phase shift $\Phi$ may be $\pi/2$ radians (90°). Alternatively, the first and second full-floating bearings 20, 50 may be different and therefore include different features from each other.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A turbocharger for receiving exhaust gas from an internal combustion engine and for delivering compressed air to the internal combustion engine, said turbocharger comprising:
a turbine wheel;
a shaft coupled to and rotatable by said turbine wheel, with said shaft extending along a shaft axis;
a compressor wheel coupled to said shaft and rotatable by said shaft for delivering compressed air to the internal combustion engine;
a bearing housing extending along said shaft axis between said turbine wheel and said compressor wheel, with said bearing housing defining a bearing housing interior, and with said bearing housing disposed about said shaft such that said shaft is disposed at least partially in said bearing housing interior; and
a full-floating bearing disposed about said shaft and in said bearing housing interior, with said full-floating bearing having a central axis and comprising,
an outer surface facing said bearing housing away from said central axis, and
an inner surface facing said shaft and radially spaced from said outer surface with respect to said central axis such that said inner surface is disposed between said central axis and said outer surface,
with said full-floating bearing defining an aperture between said outer surface and said inner surface configured to allow lubricant to flow between said outer surface and said inner surface, and
with said inner surface having a surface profile for reducing vibration of said shaft, with said surface profile defined by an equation $R_o = R_b + A \sin(3\theta + \Phi)$ where,
$R_o$ is a distance from said central axis to said inner surface for a given angle $\theta$,
$R_b$ is an average distance from said central axis to said inner surface,
$A$ is a difference between a maximum $R_o$ and $R_b$,
$\theta$ is from 0 to $2\pi$ radians about said central axis with respect to a reference line extending perpendicularly from said central axis through said aperture, and
$\Phi$ is a phase shift from 0 to $2\pi$ radians.

2. The turbocharger as set forth in claim 1, wherein said outer surface defines an annular groove circumferentially about said central axis, with said annular groove configured to receive the lubricant, and wherein said aperture is defined between said annular groove and said inner surface and configured to allow the lubricant to flow between said annular groove and said inner surface.

3. The turbocharger as set forth in claim 1, wherein $\Phi$ is from $11\pi/36$ radians to $25\pi/36$ radians.

4. The turbocharger as set forth in claim 1, wherein said aperture is further defined as a first aperture, and wherein said full-floating bearing further defines a second aperture between said outer surface and said inner surface configured to allow the lubricant to flow between said outer surface and said inner surface.

5. The turbocharger as set forth in claim 4, wherein said first and second apertures are spaced circumferentially from each other at an angle of from $5\pi/9$ radians to $7\pi/9$ radians with respect to said central axis, and wherein $\Phi$ is from $11\pi/36$ radians to $25\pi/36$ radians.

6. The turbocharger as set forth in claim 4, wherein said full-floating bearing further defines a third aperture between said outer surface and said inner surface configured to allow the lubricant to flow between said outer surface and said inner surface.

7. The turbocharger as set forth in claim 6, wherein said first, second, and third apertures are spaced circumferentially from each other at an angle of from $5\pi/9$ radians to $7\pi/9$ radians with respect to said central axis, and wherein $\Phi$ is from $11\pi/36$ radians to $25\pi/36$ radians.

8. The turbocharger as set forth in claim 1, wherein said full-floating bearing is further defined as a first full-floating bearing, and wherein said turbocharger further comprises,
a second full-floating bearing disposed about said shaft and in said bearing housing interior, with said second full-floating bearing spaced from said first full-floating bearing such that said first full-floating bearing is disposed between said second full-floating bearing and said turbine wheel, with said full-floating bearing having a central axis and comprising,
an outer surface facing said bearing housing away from said central axis, and
an inner surface facing said shaft and radially spaced from said outer surface with respect to said central axis such that said inner surface is disposed between said central axis and said outer surface,
with said full-floating bearing defining an aperture between said outer surface and said inner surface configured to allow the lubricant to flow between said outer surface and said inner surface, and
with said inner surface having a surface profile for reducing vibration of said shaft, with said surface profile defined by said equation $R_o = R_b + A \sin(3\theta + \Phi)$).

9. The turbocharger as set forth in claim 8, wherein said outer surface of each of said first and second full-floating bearings defines an annular groove circumferentially about said central axis, with said annular groove configured to receive the lubricant, and wherein said aperture of each of said first and second full-floating bearings is defined between said annular groove and said inner surface and configured to allow the lubricant to flow between said annular groove and said inner surface.

10. The turbocharger as set forth in claim 8, wherein said aperture of each of said first and second full-floating bearings is further defined as a first aperture, and wherein each of said first and second full-floating bearings further define a second aperture and a third aperture between said outer surface and said inner surface configured to allow the lubricant to flow between said outer surface and said inner surface.

11. The turbocharger as set forth in claim 10, wherein said first, second, and third apertures of each of said first and second full-floating bearings are spaced circumferentially from each other at an angle of from $5\pi/9$ radians to $7\pi/9$ radians with respect to said central axis, and wherein $\Phi$ of said first and second full-floating bearings is from $11\pi/36$ radians to $25\pi/36$ radians.

12. A full-floating bearing for reducing vibration of a shaft of a turbocharger, with said full-floating bearing having a central axis, said full-floating bearing comprising:
an outer surface configured to face away from the central axis; and
an inner surface configured to face the central axis and radially spaced from said outer surface with respect to the central axis such that said inner surface is configured to be disposed between the central axis and said outer surface;

wherein an aperture is defined between said outer surface and said inner surface and configured to allow lubricant to flow between said outer surface and said inner surface, and with said inner surface having a surface profile for reducing vibration of the shaft of the turbocharger, with said surface profile defined by an equation $Ro=Rb+A \sin(3\theta+\Phi)$ where, Ro is a distance from the central axis to said inner surface for a given angle $\theta$, Rb is an average distance from the central axis to said inner surface, A is a difference between a maximum Ro and Rb, $\theta$ is from 0 to $2\pi$ radians about the central axis with respect to a reference line extending perpendicularly from the central axis through said aperture, and $\Phi$ is a phase shift from 0 to $2\pi$ radians.

13. The full-floating bearing as set forth in claim 12, wherein said outer surface defines an annular groove circumferentially about the central axis, with said annular groove configured to receive the lubricant, and wherein said aperture is defined between said annular groove and said inner surface and configured to allow the lubricant to flow between said annular groove and said inner surface.

14. The full-floating bearing as set forth in claim 12, wherein $\Phi$ is from $11\pi/36$ radians to $25\pi/36$ radians.

15. The full-floating bearing as set forth in claim 12, wherein said aperture is further defined as a first aperture, and wherein a second aperture is defined between said outer surface and said inner surface and configured to allow the lubricant to flow between said outer surface and said inner surface.

16. The full-floating bearing as set forth in claim 15, wherein said first and second apertures are spaced circumferentially from each other at an angle of from $5\pi/9$ radians to $7\pi/9$ radians with respect to the central axis, and wherein $\Phi$ is from $11\pi/36$ radians to $25\pi/36$ radians.

17. The full-floating bearing as set forth in claim 15, wherein a third aperture is defined between said outer surface and said inner surface and configured to allow the lubricant to flow between said outer surface and said inner surface.

18. The full-floating bearing as set forth in claim 17, wherein said first, second, and third apertures are spaced circumferentially from each other at an angle of from $5\pi/9$ radians to $7\pi/9$ radians with respect to the central axis, and wherein $\Phi$ is from $11\pi/36$ radians to $25\pi/36$ radians.

\* \* \* \* \*